US006623805B2

(12) United States Patent
Caroline et al.

(10) Patent No.: US 6,623,805 B2
(45) Date of Patent: Sep. 23, 2003

(54) METHOD AND MATERIALS FOR FINISHED SURFACE PROTECTION

(76) Inventors: Brad Caroline, P.O. Box 726, Livermore, CA (US) 94551; Craig Puderbach, 944 Gotland Ct., Tracey, CA (US) 95376

( * ) Notice: Subject to any disclaimer, the term of this patent is extended or adjusted under 35 U.S.C. 154(b) by 0 days.

(21) Appl. No.: 09/747,222

(22) Filed: Dec. 26, 2000

(65) Prior Publication Data

US 2002/0081383 A1 Jun. 27, 2002

(51) Int. Cl.⁷ .............................. B05D 1/02; B05D 1/36; B05D 5/00; B05D 7/24
(52) U.S. Cl. .................... 427/407.1; 427/154; 427/282; 427/422; 427/426
(58) Field of Search .............................. 427/154, 155, 427/156, 256, 258, 259, 269, 287, 402, 407.1, 421, 422, 426, 282; 4/DIG. 18, 580, 584, 612, 613; 106/600, 610, 622, 634, 287.34

(56) References Cited

U.S. PATENT DOCUMENTS

| | | | | | |
|---|---|---|---|---|---|
| 3,657,001 A | * | 4/1972 | Parker | ..................... | 427/388.3 |
| 3,846,355 A | * | 11/1974 | Mayer | ........................ | 524/157 |
| 4,396,681 A | * | 8/1983 | Rizk et al. | ................ | 428/423.1 |
| 4,461,788 A | * | 7/1984 | Wyman | ....................... | 427/421 |
| 4,511,626 A | * | 4/1985 | Schumacher | ................ | 427/409 |
| 5,143,949 A | | 9/1992 | Grogan et al. | | |
| 5,193,716 A | * | 3/1993 | Horiki et al. | .................. | 221/1 |
| 5,308,647 A | | 5/1994 | Lappi | | |
| 5,372,637 A | * | 12/1994 | Dwight, Jr. | ................. | 106/244 |
| 5,523,117 A | | 6/1996 | Woodhall et al. | | |
| 5,851,618 A | * | 12/1998 | Liddell et al. | ............. | 428/41.8 |

FOREIGN PATENT DOCUMENTS

GB            1 306 020      *   2/1973   ........... B01F/15/02

* cited by examiner

Primary Examiner—Shrive P. Beck
Assistant Examiner—William Phillip Fletcher, III
(74) Attorney, Agent, or Firm—Charles L. Thoeming

(57) ABSTRACT

A protective material comprising a pre-polymer and a curative is applied to a finished surface. Near equal amounts of the pre-polymer and curative are mixed, pre-heated, and applied to the finished surface by a portable spray mixer apparatus having a disposable mixing spray nozzle. For temporary protection, a releasing agent is applied to the finished surface prior to application of the protective material. The short cure period of the present invention facilitates repeated, fast applications in construction sites to provide impenetrable protection for finished surfaces.

4 Claims, No Drawings

METHOD AND MATERIALS FOR FINISHED SURFACE PROTECTION

CROSS-REFERENCES TO RELATED APPLICATIONS

None.

STATEMENT REGARDING FEDERALLY SPONSORED RESEARCH OR DEVELOPMENT

None.

REFERENCE TO MICROFICHE APPENDIX

None.

BACKGROUND OF THE INVENTION

1. Field of the Invention

The invention relates to sealing products and improved methods of application to provide an impenetrable and either permanent or easily removable durable, protective coating for a variety of surfaces or uses.

2. Description of the Related Art Including Information Disclosed under 37 C.F.R. 1.97 and 1.98

A search of the prior art located the following United States patents which are believed to be representative of the present state of the prior art: U.S. Pat. No. 5,143,949, issued Sep. 1, 1992, U.S. Pat. No. 5,308,647, issued May 3, 1994, U.S. Pat. No. 5,523,117, issued Jun. 4, 1996, U.S. Pat. No. 5,550,182, issued Aug. 27, 1996, and U.S. Pat. No. 5,851,618, issued Dec. 22, 1998. These references, however, suffer from one or more of the following disadvantages, as more specifically detailed below.

BRIEF SUMMARY OF THE INVENTION

Numerous masking or coating compounds or methods are known in the field of art to seal or otherwise protect surfaces or finishes from undesired contact with processing or construction unrelated to the surfaces or finishes. These known compounds or methods, however, do not protect against penetration by foreign objects contacting or otherwise resting on the sealed surface and which become further forced into the surface by foot-traffic, accidental dropping, or similar external forces related to construction or repair activities taking place proximately to the sealed surface area. The sealed surfaces presented in the prior art are most suitable to temporarily protect against paint overspray, sun damage, or weather damage. These prior art surfaces, however, lack durability and require time consuming, separate applications for any associated release agents plus the protective surface for removable applications. The prior art application methods do not use individually portable application means, thus limiting their range and suitability for applications in close quarters.

It is an object of the present invention to provide an economical, durable multi-purpose surface coating.

It is another object of the present invention to provide such a surface coating which is also quickly and easily applied to any surface in one application.

It is another object of the present invention to provide such a surface coating which can be quickly and easily removed once the activity upon or around the surface, and which activity is being guarded against, has ceased.

It is yet another object of the present invention to provide such a surface coating which can be permanently applied, depending upon the application, to guard against weather, water, sun damage, wind damage, or to provide specific desired benefits such as improved traction for wet surfaces.

Another object of the present invention is to provide a method to allow for portable self-contained applications of such surfaces using apparatus known in the art.

Yet another object of the present invention is to provide such a surface coating which is impenetrable from most activities which would otherwise scrape, chip, gouge, crack, scar, dent, or discolor an unprotected surface.

Yet another object of the present invention is to provide such a surface coating applicable to unfinished or finished surfaces including, but not limited to, porcelain, concrete, metal, stone, tile, glass, plastic, wood, or composite materials, regardless of the vertical or horizontal orientation of said finished surfaces.

Yet another object of the present invention is to provide such a surface coating in order to avoid scratching, nicking, marring, chipping, staining, painting, and abrading unfinished or finished surfaces including, but not limited to, porcelain, concrete, metal, stone, tile, glass, plastic, wood, or composite materials.

These together with other objects of the invention, along with the various features of novelty which characterize the invention, are described with particularity in the claims attached to and forming a part of this disclosure. For a better understanding of the invention, its operating advantages and the specific objects attained by its uses, reference should be made to the descriptive materials in which there are described various preferred embodiments of the invention. Other features, advantages, and objects of the present invention will become apparent with reference to the following description.

BRIEF DESCRIPTION OF DRAWINGS

There are no drawing of the present invention.

DETAILED DESCRIPTION OF THE INVENTION

The detailed description, as set forth below, is intended as a description of the composition and method of the preferred embodiment of the invention, and is not intended to represent the only form in which the present invention may be constructed or operated. It is to be understood that the invention may be practiced by other different embodiments, which are also encompassed within the spirit and scope of the invention.

The preferred embodiment of this invention provides a method for protecting bath tubs, whirlpools, shower stalls, tile, marble, glass, metal, and other smooth non-porous surfaces during construction work surrounding such surfaces. This embodiment provides a protective surface coating composition and portable method which can be quickly and easily applied and removed once the construction activity upon or around the surface, selected to be guarded from such activity, has ceased. This embodiment further provides a protective surface coating that is both durable and applied in a portable single spray application for any permanent coating after the surface has been treated with a primary sprayed release agent for removable coating applications. Because of the method of application, this embodiment is equally easily applied to vertical as well as horizontal surfaces.

It has been found through testing and experimentation that for general purposes the preferred coating formulation for the present invention is a 49%—52% mixture by weight or volume of a pre-polymer mixture to correlative percentage of a curative mixture, resulting in a mixture of within 3% equal parts by volume or weight of the two ingredients. For the preferred embodiment, this mixing of ingredients is accomplished at the disposable spray nozzle of a portable spray applicator. Such spray applicators are known in the art and provide separate product reservoirs which feed through separate, heated flow lines to the spray nozzle. The heated flow lines allow for the optimal application temperature of the coating material of 120 degrees Fahrenheit. This preferred embodiment of the present invention is provided by using a composition of a prepolymer polyurethane from the isocyanate terminated prepolymer family and a curative polyurethane from the hydroxyl terminated polyether polyol chemical family. The preferred embodiment of the present invention uses a blended silicone solution as a releasing agent. These preferred embodiment ingredients provide optimal results when applied to surfaces between ambient temperatures of 45 degrees Fahrenheit and 85 degrees Fahrenheit.

The prepolymer polyurethane of the preferred embodiment of the present invention includes a mixture of from 35% to 75% polymeric diphenylmethane diisocyanate, preferably 70%; from 7% to 35% 4,4-diphenylmethane diisocyanate, preferably 25%; and less than 8% trischloropropyl phosphate, preferably 5%.

The curative polyurethane of the preferred embodiment of the present invention includes a mixture of: less than 76% hydroxl terminated poly (oxyalkylene) polyethers, preferably 74%; less than 17.5% butanediol, preferably 17%; less than 9% diethyltoluenediamine, preferably 8.1%; and less than 1% of organotin catalyst, preferably 0.9%.

One possible releasing agent of the preferred embodiment of the present invention includes a mixture of: less than 2% Stoddard solvent, preferably 1.5%; 90% aliphatic hydrocarbon; and less than 10% silicone blend, preferably 8.5%. An alternate releasing agent for the preferred embodiment of the present invention includes 90% aliphatic hydrocarbon and 10% silicone blend.

Another embodiment of the present invention uses a composition of a prepolymer polyurethane from the isocyanate chemical family which includes a mixture of: less than 1% of toluene diisocyanate, preferably 0.5%; from 20% to 67% isocyanate terminated prepolymer, preferably 45%; from 4% to 10% diphenylmethane diisocyanate, preferably 7%; from 2% to 4.5% higher oligomers of MDI, preferably 2%; up to 13% parafinic and naphthenic petroleum blend, preferably 5%; from 16% to 58% chlorinated hydrocarbon, preferably 38%; and from 2% to 3% hydrophobic silica, preferably 2.5%. This embodiment of the present invention uses a composition of a curative polyurethane which includes a mixture of: less than 0.6% of an organomercury catalyst, preferably 0.5%; from 10% to 17% petroleum hydrocarbon, preferably 15%; from 38% to 45% polyether polyols, preferably 43%; from 26% to 37% calcined kaolin, preferably 35%; and from 8% to 12% hydrophobic silica, preferably 6.5%.

The coating materials of either embodiment of the present invention are applied by a portable spray method which takes advantage of the near equal parts pre-polymer to curative ratios and the point of application mixing afforded by the spray application. The preferred method includes inspection of the surface to be coated to insure that the surface is free from dust, dirt, abrasive materials, oil, moisture, and any other condition that would interfere with the application process. Thereafter, the boundaries of the surface to be coated are masked with a suitable material, such as masking tape. Any standard sized functional opening in the application surface for temporary coatings is likewise protected by applying convex polyvinyl molds over such opening prior to the application of coating materials. Non-standard sized functional openings are protected using polyvinyl film known in the art. When the ambient temperature is between the optimal range for the coating materials to be used, a releasing agent is applied to the surface to be coated for temporary applications. Permanent coating applications do not require application of a releasing agent. Prepackaged equal amounts of the coating materials selected for use are loaded into the portable spray applicator which is fitted with a disposable mixing spray nozzle. The selected coating materials are then heated to 120 degrees Fahrenheit. Once the coating materials reach this preheated temperature, they are applied to the surface to be coated by use of the portable spray applicator. For temporary coating applications, the vertical surface coating thickness is typically from 1/32 to 1/16 of an inch. For temporary coating applications, the horizontal surface coating surface is typically from 1/16 to 3/32 of an inch. For permanent coating applications, the application coating thickness is adjusted to suit each particular permanent application. After the initial application of heated coating materials have been applied, said applied protective material coating can be adjusted by reapplying said protective material as necessary. The coated surface is allowed to cure, a period which ranges between 10 minutes and 15 minutes, depending upon the ambient temperature, relative ratios of pre-polymer and curative, and atmospheric pressure. Once the protective coating has cured, the desired activities to be performed upon or around the protective coating and the protected surface can commence and be completed. If the protective coating is temporary, the protective coating and masking materials are easily removed upon completion of the desired activities. Similarly, the convex molded coatings and the underlying convex polyvinyl molds over any functional openings can be easily located and cut open by tradesmen needing to access the opening for repairs while the protective coating covers the protectively coated surface.

With respect to the above description then, it is to be realized that the optimum compositional relationships and methods for the invention, to include variations in size, materials, shape, form, function and manner of operation, assembly, manufacture, and use, are deemed readily apparent and obvious to one skilled in the art, and all equivalent relationships to described in the specification are intended to be encompassed by the present invention.

Therefore, the foregoing is considered as illustrative only of the principles of the invention. Additionally, since numerous modifications and changes will readily occur to those skilled in the art, it is not desired to limit the invention to the exact composition and methods described, and further, all suitable modifications and equivalents may be resorted to, falling within the scope of the invention.

We claim:

1. A method for protecting finished bathtub and shower pan fixture surfaces comprising the steps of:

inspecting the application surface;

applying masking materials to protect the application surface boundary;

heating a protective material to a temperature of 120 degrees Fahrenheit, wherein the protective material comprises between 49% to 52% by weight of a prepolymer mixture and between 49% to 52% by weight of a curative mixture, and wherein the pre-polymer mixture comprises 70% polymeric diphenylmethane diisocyanate, 25% 4,4-diphenylmethane diisocyanate, and 5% trischloropropyl phosphate;

using a portable compressor sprayer further comprising a disposable spray nozzle tip wherein the pre-polymer mixture and the curative mixture are mixed at the disposable spray nozzle tip to apply the heated protective material to coat the application surface once an ambient temperature range between 45 degrees Fahrenheit and 85 degrees Fahrenheit is met;

inspecting the protective material coating for consistency;

adjusting the protective material coating by reapplying the protective material as necessary;

allowing a period of ten (10) to fifteen (15) minutes for the protective material coating to cure; and removing any masking materials used to protect the application surface boundary.

2. A method for protecting finished bathtub and shower pan fixture surfaces comprising the steps of:

inspecting the application surface;

applying masking materials to protect the application surface boundary;

heating a protective material to a temperature of 120 degrees Fahrenheit, wherein the protective material comprises between 49% to 52% by weight of a pre-polymer mixture and between 49% to 52% by weight of a curative mixture, and wherein the curative mixture comprises 74% hydroxyl terminated poly(oxyalkylene) polyethers, 17% butanediol, 8.1% diethyltouluenediamine and 0.9% oganotin catalyst;

using a portable compressor sprayer further comprising a disposable spray nozzle tip wherein the pre-polymer mixture and the curative mixture are mixed at the disposable spray nozzle tip to apply the heated protective material to coat the application surface once an ambient temperature range between 45 degrees Fahrenheit and 85 degrees Fahrenheit is met;

inspecting the protective material coating for consistency;

adjusting the protective material coating by reapplying the protective material as necessary;

allowing a period of ten (10) to fifteen (15) minutes for the protective material coating to cure; and removing any masking materials used to protect the application surface boundary.

3. A method for protecting finished bathtub and shower pan fixture surfaces comprising the steps of:

inspecting the application surface;

applying masking materials to protect the application surface boundary;

heating a protective material to a temperature of 120 degrees Fahrenheit, wherein the protective material comprises between 49% to 52% by weight of a pre-polymer mixture and between 49% to 52% by weight of a curative mixture, and wherein the pre-polymer mixture comprises 0.5% toluene diisocyanate, 45% isocyanate terminated prepolymer, 7% diphenylmethane diisocyanate, 2% higher oligomers of MDI, 5% paraffinic and naphthenic petroleum blend, 38% chlorinated hydrocarbon, and 2.5% hydrophobic silica;

using a portable compressor sprayer further comprising a disposable spray nozzle tip wherein the pre-polymer mixture and the curative mixture are mixed at the disposable spray nozzle tip to apply the heated protective material to coat the application surface once and ambient temperature range between 45 degrees Fahrenheit and 85 degrees Fahrenheit is met;

inspecting the protective material coating for consistency;

adjusting the protective material coating by reapplying the protective material as necessary;

allowing a period of ten (10) to fifteen (15) minutes for the protective material coating to cure; and removing any masking materials used to protect the application surface boundary.

4. A method for protecting finished bathtub and shower pan fixture surfaces comprising the steps of:

inspecting the application surface;

applying masking materials to protect the application surface boundary;

heating a protective material to a temperature of 120 degrees Fahrenheit, wherein the protective material comprises between 49% to 52% by weight of a pre-polymer mixture and between 49% to 52% by weight of a curative mixture, and wherein the curative mixture comprises 0.5% organomercury catalyst, 15% petroleum hydrocarbon, 43% polyether polyols, 35% calcined kaolin, and 6.5% hydrophobic silica;

using a portable compressor sprayer further comprising a disposable spray nozzle tip wherein the pre-polymer mixture and the curative mixture are mixed at the disposable spray nozzle tip to apply the heated protective material to coat the application surface once and ambient temperature range between 45 degrees Fahrenheit and 85 degrees Fahrenheit is met;

inspecting the protective material coating for consistency;

adjusting the protective material coating by reapplying the protective material as necessary;

allowing a period of ten (10) to fifteen (15) minutes for the protective material coating to cure; and removing any masking materials used to protect the application surface boundary.

* * * * *